United States Patent [19]

Deregibus

[11] Patent Number: 5,718,798
[45] Date of Patent: *Feb. 17, 1998

[54] MACHINE FOR MANUFACTURING VULCANIZED-RUBBER TUBES

[75] Inventor: Andrea Deregibus, Padova, Italy

[73] Assignee: Deregibus A. & A. S.p.A., Saccolongo, Italy

[*] Notice: The term of this patent shall not extend beyond the expiration date of Pat. No. 5,512,127.

[21] Appl. No.: 588,182

[22] Filed: Apr. 10, 1996

Related U.S. Application Data

[62] Division of Ser. No. 169,252, Dec. 20, 1993, Pat. No. 5,512,127.

[30] Foreign Application Priority Data

May 26, 1993 [IT] Italy ............................... PD93A0122

[51] Int. Cl.⁶ ............................. B29C 53/62; B65H 81/02
[52] U.S. Cl. ........................... 156/429; 156/187; 156/195; 156/432; 493/298; 493/299
[58] Field of Search .................................. 156/195, 431, 156/432, 171, 169, 173, 175, 187, 429; 242/7.08, 741, 7.15, 47.04, 47.06; 493/298, 299, 302

[56] References Cited

U.S. PATENT DOCUMENTS

| | | |
|---|---|---|
| 2,262,636 | 7/1941 | Cuno. |
| 2,804,907 | 9/1957 | Casey et al.. |
| 3,522,122 | 7/1970 | Granahl .......................... 156/173 X |
| 5,145,543 | 9/1992 | Redd et al. ...................... 156/187 X |
| 5,221,391 | 6/1993 | Kittaka et al. .................. 156/173 X |
| 5,512,127 | 4/1996 | Deregitus. |

FOREIGN PATENT DOCUMENTS

| | | |
|---|---|---|
| 0410367 | 1/1991 | European Pat. Off.. |
| 0231154 | 8/1997 | European Pat. Off.. |

*Primary Examiner*—Michael W. Ball
*Assistant Examiner*—Samchuan Yao
*Attorney, Agent, or Firm*—Guido Modiano; Albert Josif

[57] ABSTRACT

The machine for manufacturing vulcanized-rubber tubes has a pair of heads arranged oppositely with respect to mandrels which rotate two or more tubular cores, supported by supporting elements with fixed rollers on a supporting frame. The tubular cores are contained in a thermally insulated box-like container, wrapped in the tubes to be vulcanized and unloaded by transfer means. The container has heads for supplying electrical power to the cores. Devices are provided for removing the cores from the container. The machine also has a carriage which can move along guides which are parallel to the cores, and a mechanism for wrapping the cores simultaneously with spirals of the materials to be used to manufacture tubes.

7 Claims, 6 Drawing Sheets

Fig. 2

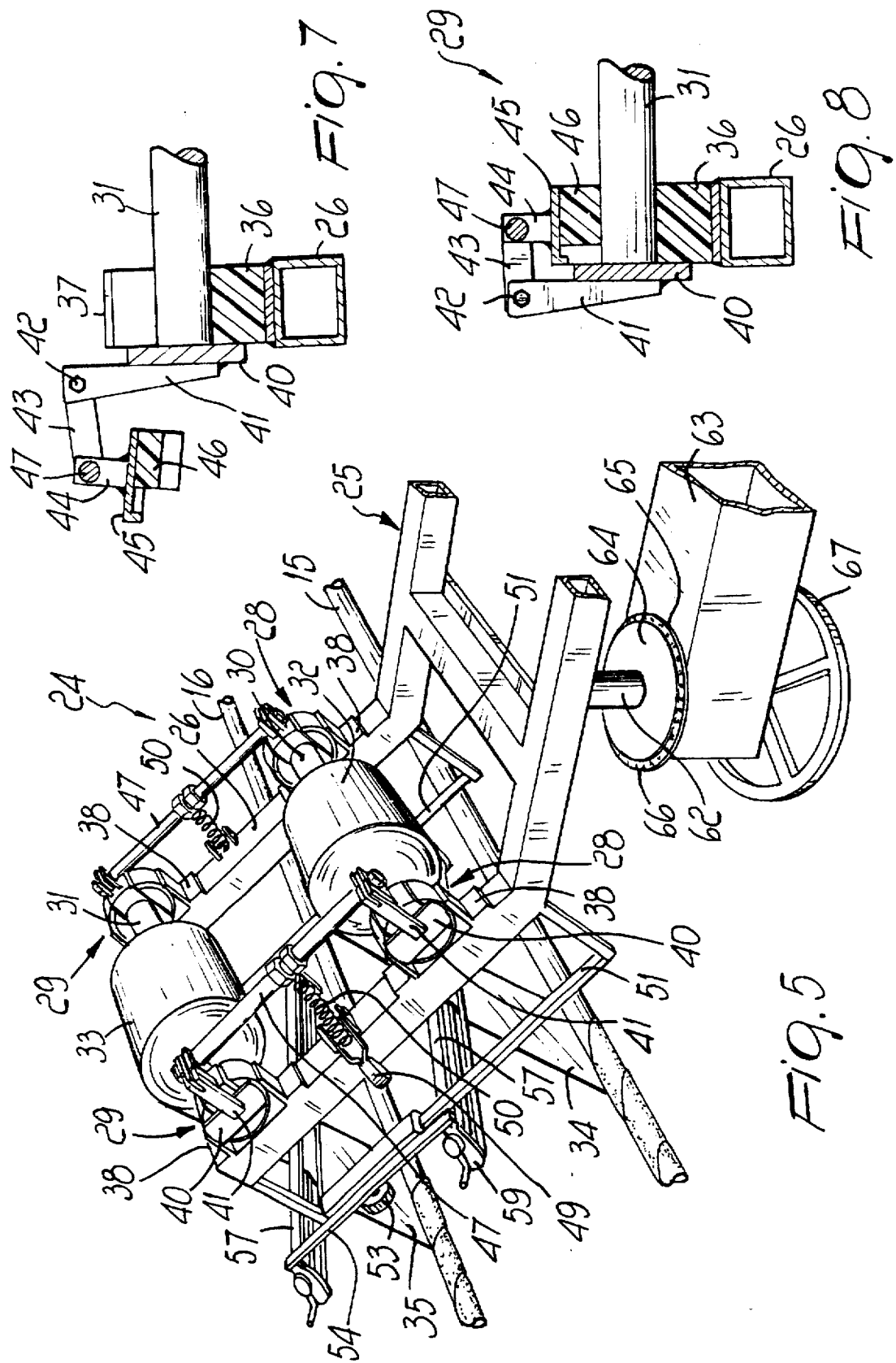

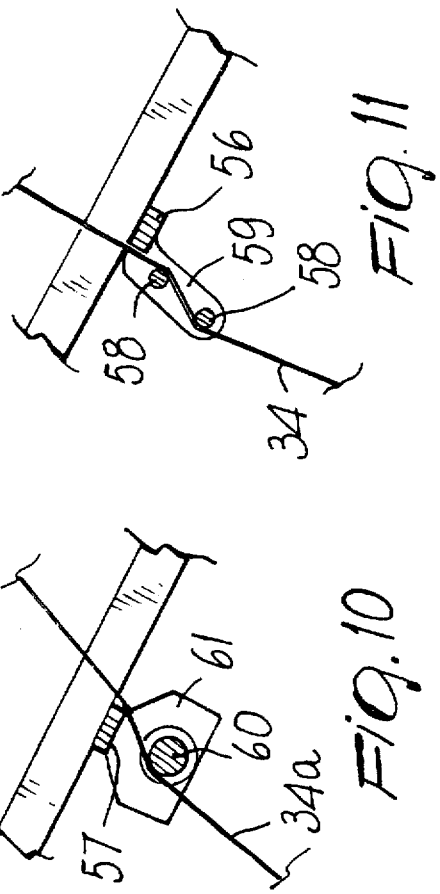
Fig. 9
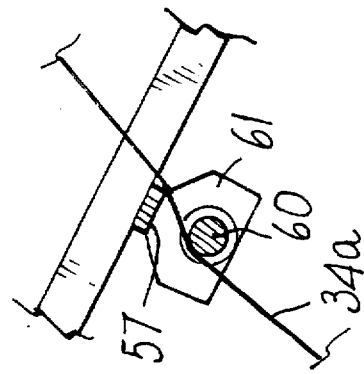
Fig. 11
Fig. 10
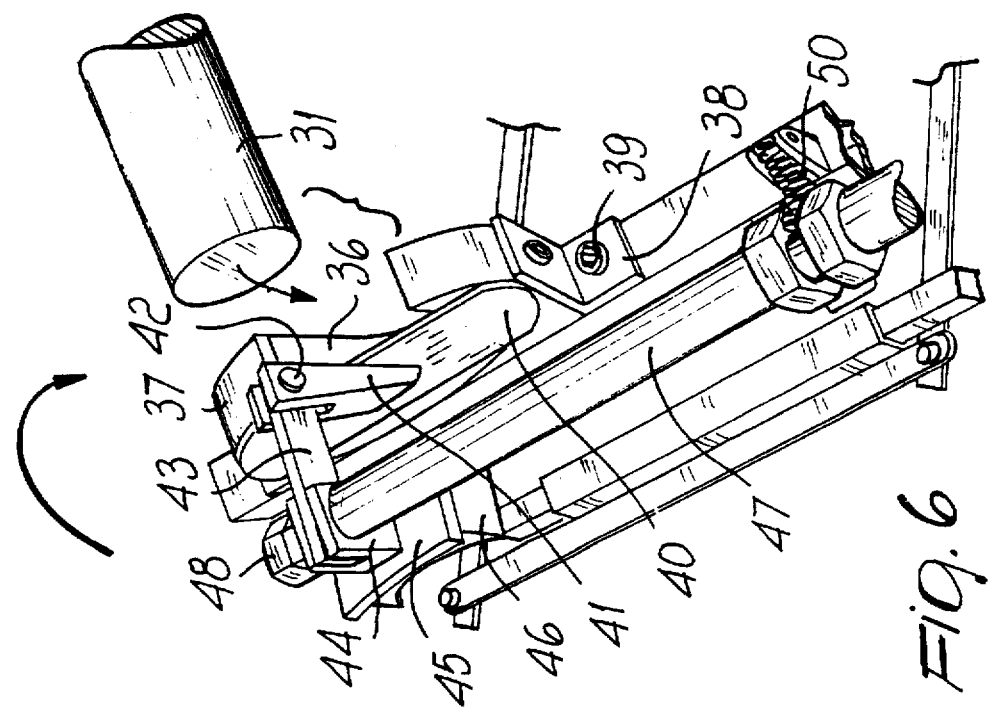
Fig. 6

MACHINE FOR MANUFACTURING VULCANIZED-RUBBER TUBES

This application is a division application of application Ser. No. 08/169,252, filed Dec. 20, 1993, now U.S. Pat. No. 5,512,127.

BACKGROUND OF THE INVENTION

The present invention relates to an improved machine for manufacturing vulcanized-rubber tubes.

A machine disclosed in EP no. 0410367 in the name of the same Assignee is currently used to manufacture vulcanized-rubber tubes.

Said machine comprises a pair of heads arranged oppositely with respect to mandrels which rotate two tubular cores supported by supporting elements with fixed rollers on a supporting frame.

The tubular cores are flanked by a thermally insulated openable box-like container suitable to contain said cores when they are surrounded by the tubes to be vulcanized and after the unloading thereof, which is performed with transfer means.

The heads of the container are provided with terminal strips for supplying electrical power to the cores and for heating them by means of the Joule effect.

Means for removing the cores from the container are provided.

Wrapping of the cores with spirals of the materials to be used to manufacture the tubes is performed with the aid of a carriage which can slide along rails arranged on the ground parallel to said cores.

An operator is carried on board the carriage from one end of the machine to the other and holds the various coils of material to be wrapped in his hands.

Naturally, the operator is capable of performing a single wrapping operation at a time on a single core at a time.

This constitutes a considerable operational limitation for the machine as regards its production rate, which is consequently limited.

It should also be noted that in order to achieve qualitatively good production of the tubes, the various spirals obtained from the ribbons being wrapped must mutually overlap in a preset and constant manner.

The presence of an operator, onboard the carriage, who distributes the materials, introduces in the evaluation of qualitative results the variable constituted by the skill of said operator in keeping the reels from which the materials are unwound during carriage movement in the correct position with respect to the machine.

SUMMARY OF THE INVENTION

The aim of the present invention is to provide a machine for manufacturing vulcanized-rubber tubes which allows higher production yields than current ones and a reduction in assigned personnel.

A consequent primary object is to eliminate the variable constituted by the skill of the operator during the core wrapping operations.

Another important object is to provide a machine which allows to manufacture tubes of different types and having different characteristics while always operating in the same conditions.

Another object is to improve the qualitative yield of machines suitable for manufacturing vulcanized-rubber tubes.

This aim, these objects and others which will become apparent hereinafter are achieved by an improved machine for manufacturing vulcanized-rubber tubes, of the type which comprises a pair of heads arranged oppositely to mandrels which rotate two or more tubular cores supported by supporting elements with fixed rollers on a supporting frame, said tubular cores being flanked by a thermally insulated openable box-like container which contains said cores, wrapped with the tubes to be vulcanized and unloaded by transfer means; the heads of said container having means for supplying electric power to the cores, and means being provided for removing the cores from said container; said machine comprising a carriage movable along guides which are parallel to said cores, and means provided on said carriage for wrapping said cores simultaneously with spirals of the materials to be used to manufacture the tubes.

BRIEF DESCRIPTION OF THE DRAWINGS

Further characteristics and advantages of the machine according to the invention will become apparent from the detailed description of an embodiment thereof, illustrated only by way of non-limitative example in the accompanying drawings, wherein:

FIGS. 4 and 5 are perspective views of details of the wrapping means of FIG. 2;

FIG. 6 is a perspective view of one of the supports of the reels which carry the ribbons of the materials to be wrapped, in an open position;

FIGS. 7 and 8 are sectional views of the support of FIG. 6 in open and closed positions;

FIG. 9 is a detail view of guiding means for the rubber ribbons being wrapped;

FIG. 10 is a transverse sectional view of the guiding means of FIG. 9;

FIG. 11 is a sectional view of guiding means for rubberized canvas ribbons;

DESCRIPTION OF THE PREFERRED EMBODIMENTS

Figure 1:
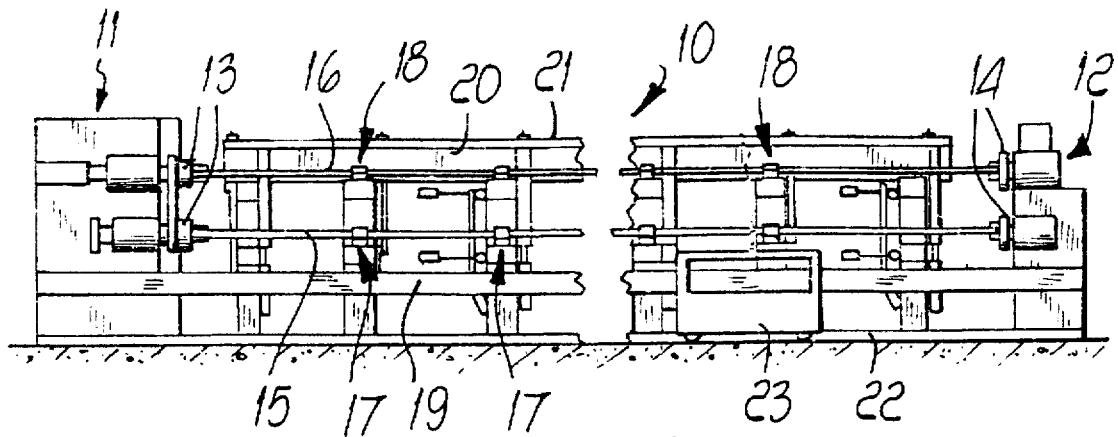
FIG. 1 is a schematic front view of the machine.
Figure 2:
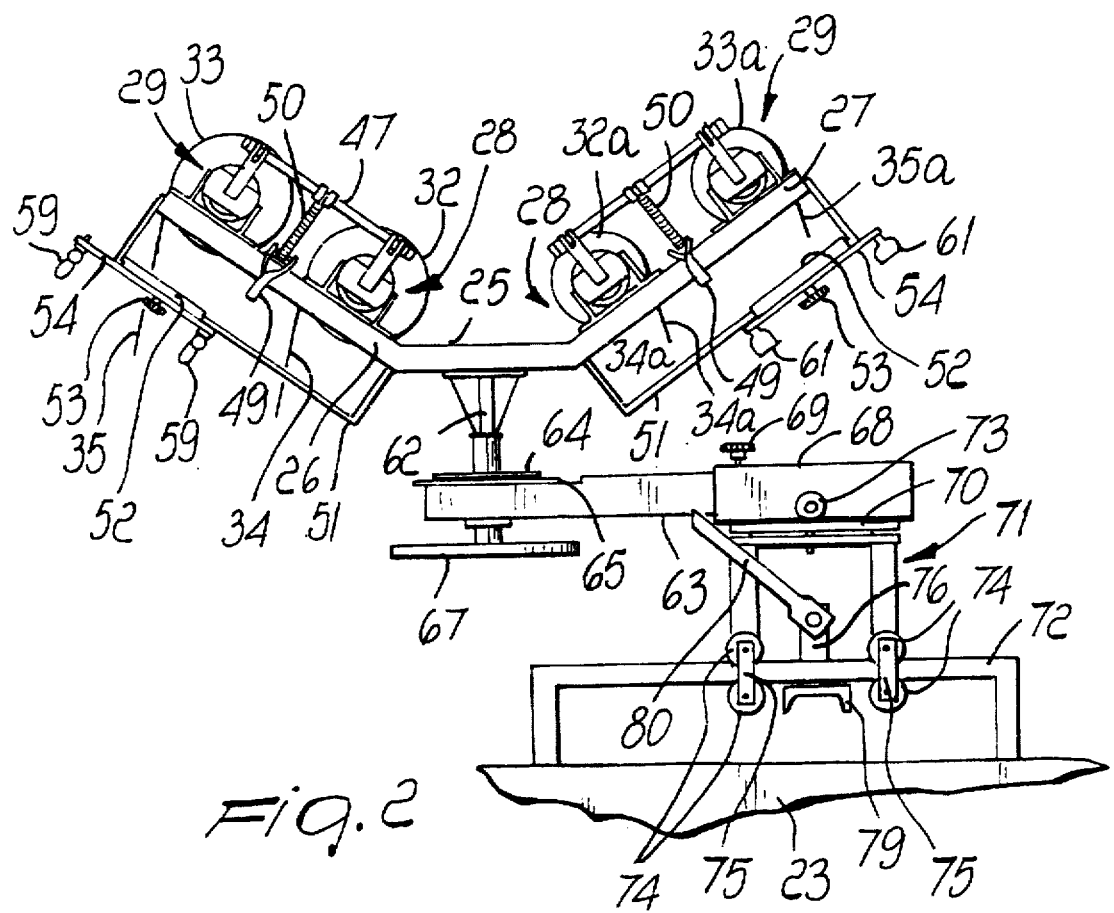
FIG. 2 is a front view of means suitable to wrap said cores simultaneously with spirals of the ribbons of materials to be used to manufacture the tubes.
Figure 3:
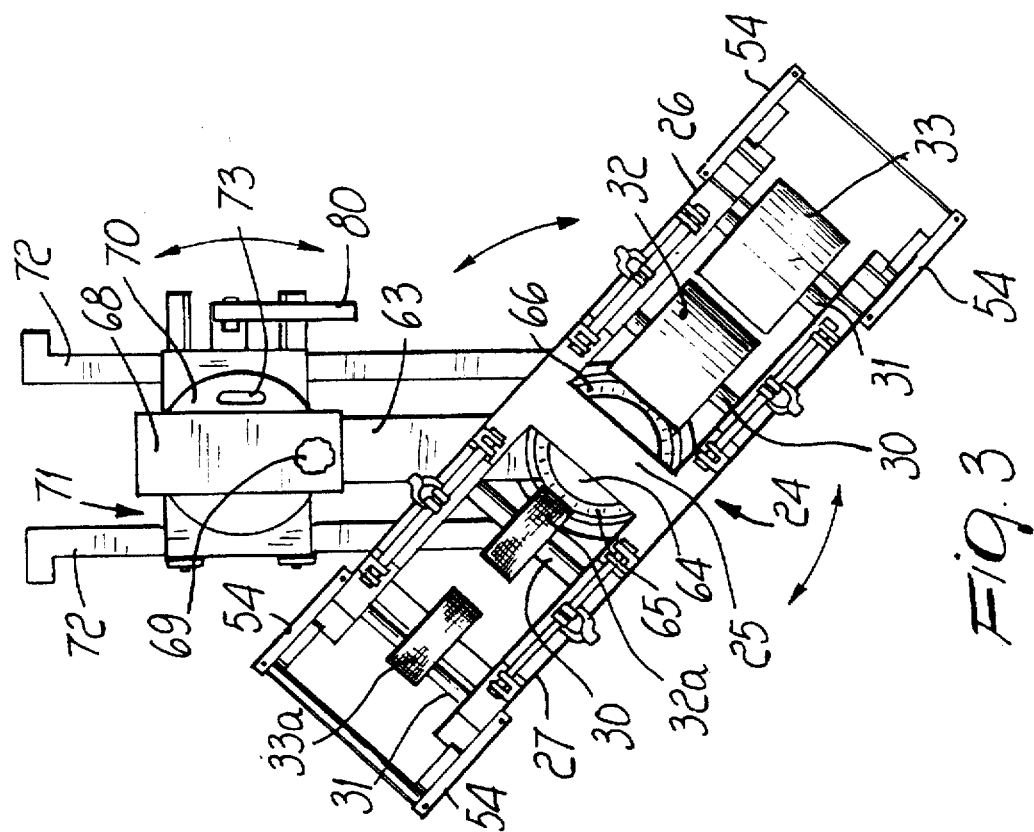
FIG. 3 is a top view of the means of FIG. 2.
Figure 4:
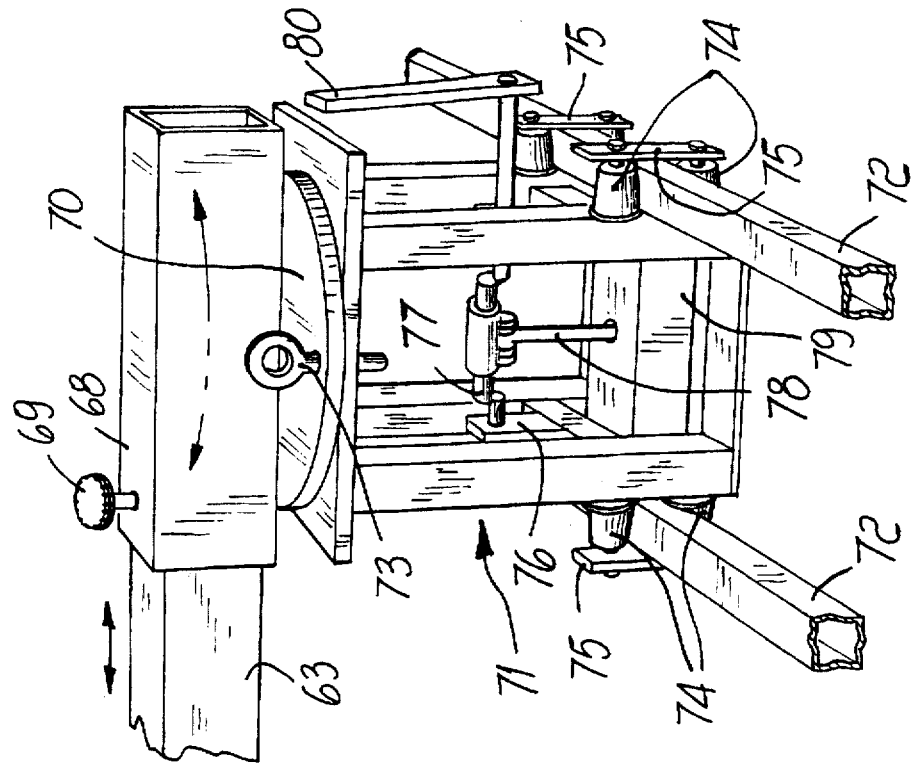

With reference to the above figures, a machine for manufacturing vulcanized-rubber tubes is generally designated by the reference numeral 10 and comprises two heads, respectively 11 and 12, the first of which is motorized.

Each head has two mandrels; in FIG. 1, two first mandrels are designated by the numeral 13 and two second mandrels are designated by the numeral 14.

The ends of two tubular metallic cores 15 and 16 are gripped by the mandrels 13 and 14.

Each mandrel is conveniently kinematically connected to an actuation motor, not shown, which is coupled to the head 11.

The two metallic cores 15 and 16, which are arranged along horizontal parallel axes at different heights with respect to the floor, are supported by roller supports, respectively 17 and 18, which are spaced to avoid excessive flexing during production and are fixed to a frame 19 made of metallic profiled elements.

Each support 17 or 18 comprises three rollers which are arranged parallel to the corresponding core 15 or 16 to allow said core to rest and roll with low friction and thus allow the unhindered wrapping of spirals of canvas and crude rubber for tube manufacture.

Said cores 15 and 16 are flanked by a thermally insulated box-like container 20 which is provided with an upper lid 21 which is pivoted thereto and can thus be opened by means of appropriate lever systems, not illustrated.

The machine 10 is also provided with transfer means, not shown for the sake of simplicity, which are suitable to remove the wrapped cores 15 and 16 and to empty the inside of the box-like container 20, and with means, also not shown for the sake of simplicity, for removing said cores 15 and 16 from the container 20 after vulcanization, which is performed by means of the Joule effect with the aid of electrical connection terminal strips, also not shown.

Said cores 15 and 16 are arranged in front of a longitudinal rail 22 which is fixed to the ground; a carriage 23 can slide on said rail and, according to the invention, carries means suitable to wrap said cores 15 and 16 simultaneously.

Said means for simultaneously wrapping said cores comprise, with reference to FIGS. 2 to 11, a frame 24 which is supported, as more clearly specified hereinafter, by the carriage 23 and is constituted by a base 25 which can rotate and be blocked about a vertical axis and from which two wings, respectively 26 and 27, diverge; said wings extend so that they move above the cores 15 and 16 by virtue of the rotation of the base 25.

Each wing bears two pairs of supports 28 and 29, to which the ends of corresponding shafts 30 and 31 are rotatably coupled; said shafts support reels 32 and 33, and respectively 32a and 33a, on which ribbons of the materials suitable to form the tubes, for example rubber ribbons 34 and 35, canvas or rubberized-fabric ribbons 34a and 35a, etc., are wound.

More particularly, each support of the pairs 28 and 29, for example the support 29 with reference to FIGS. 6 to 8, is constituted by a cradle-shaped element 36 made of nylon, which is advantageously externally covered by a shaped metallic element 37 which is provided with feet 38 and is fixed to the frame 24 by means of screws 39.

The shaped element 37 is semicircular, and two diametrically opposite portions thereof are joined, by means of a cross-member 40 which is welded thereto; an end of a connecting rod 43 is articulated, by means of a pivot 42, between the fork-like ends of a tab 41 of said cross-member; the opposite end of said connecting rod 43 is articulated to a fork-like element 44 which is fixed to a metallic support 45 which supports a sliding block 46 which is located between the wings of the cradle-like element 36, closing the rotation seat of the end of the corresponding shaft 31.

Articulation between the connecting rod 43 and the fork-like element 44 is provided by means of the pivot-like end of a bar 47 which connects each support of the pair 28 to the corresponding support of the pair 29.

The pivot-like ends of the bar 47 protrude from the fork-like element 44, and hexagonal nuts engage 48 thereon.

The ends of a cylindrical helical spring 50 are fixed between said bar 47 and a lever 49 which is pivoted on the frame 24; when the sliding blocks 46 are arranged in the cradle-like elements 36, said spring has the function of transmitting a pressure from said cradle-like elements to the shafts 30 and 31 and opposing the unwinding of the reels 32 and 33 in order to keep the ribbons, for example 34 and 35, stretched.

Tension is applied to the spring 50 by means of the rotation of the lever 49.

The spring 50 may be conveniently replaced with an electromagnetic or equivalent brake.

The articulation of the connecting rods 43 allows the disengagement of the shafts 30 and 31 from their respective seats and the replacement of the reels 32 and 33.

Each wing 26 or 27 of the frame 24 supports, in a downward region, a pair of parallel bars 51; a respective tubular element 52 can slide on each of said bars, and said tubular element can be locked by means of a locking screw 53 provided with a knob; said screw is rigidly coupled to a bar 54, and the ends of cross-members, designated by the reference numerals 56 for the wing 26 and 57 for the wing 27, are articulated to the ends of said bar 54 by means of pivots 55.

The cross-members 56 and 57 support guiding means for the ribbons; specifically, in the case of the first guiding means, assigned to the rubber ribbons 34 and 35, said means are constituted by a pair of cylindrical bars 58 which are supported between two wings 59 which extend from the cross-members 56 and between which the ribbon is passed; in the case of the second guiding means, assigned to the ribbons 34a and 35a, said means are constituted by a roller 60 which is rotatably retained between wings 61 which extend from the cross-members 57.

The bars 58 or the roller 60 adjust the inclination of the ribbons with respect to the cores 15 and 16; this inclination can be changed by varying the position of the cross-members 56 and 57 by moving the tubular elements 52 along the bars 51.

As already mentioned, the base 25 of the frame 24 can rotate and can be locked about a vertical axis; in particular, it is rigidly coupled to a vertical pivot 62 which is rotatably retained to a horizontal tubular support 63 which it crosses.

Said pivot 62 is rigidly coupled to, and concentric with, a first disk-like element 64 which rests on a second disk-like element 65 which is also concentric and is rigidly coupled to the support 63.

Angular registration notches 66 are provided between the disk-like elements 64 and 65 for positioning the wings 26 and 27 with respect to the cores 15 and 16.

Locking occurs by means of a lower handwheel 67 which screws onto the corresponding threaded end of the pivot 62.

The support 63 can slide in a tubular guide 68, the cross-section of which is complementary to that of said support.

Mutual locking of the parts can be performed by means of a screw 69 provided with a knob.

The tubular guide 68 is diametrically fixed to a disk-like plate 70 which can rotate on the upper part of a secondary carriage 71 which is in turn slideable along parallel guides 72, fixed above the carriage 23 and arranged longitudinally and parallel with respect to the cores 15 and 16.

More particularly, said disk-like plate 70 is provided with an axial pivot, not shown in the figures, which is fitted on the secondary carriage 71 and can be locked, with the guide 68 arranged at right angles to the parallel guides 72, by means of a pin 73 which passes through it in a through hole and enters a corresponding through hole of the secondary carriage 71.

Said secondary carriage 71 is constituted by a framework, made of metallic elements, to the side of which pairs of wheels 74 are rotatably coupled; the guides 72 are arranged between said wheels and, as shown in the figures, are constituted by tubular bars.

The axes of each pair of wheels 74 are connected by plates 75.

At the center of the secondary carriage 71, at right angles to the guides 72, a crankshaft 77 is rotatably coupled to supports 76; a bar 79 is suspended from its crank-shaped portion by means of a rod-like tab 78 which is articulated thereto; said bar 79 extends between the guides 72 and rests against said guides in a downward region.

A lever 80 is fixed to the shaft 77 and raises or lowers the bar 79, locking it against the guides 72 or spacing it from them, thus locking or releasing the movement of the secondary carriage 71.

It should be stressed, at this point, that the following movements are therefore possible: adjustable rotation of the frame 24 on the support 63; sliding of the support 63 on the guide 68; 90° rotation of the guide 68 on the secondary carriage 71; and sliding of the secondary carriage 71 on the carriage 23.

It should also be stressed that the carriage 23 is motorized for advancement in a synchronous manner with respect to the rotation of the cores 15 and 16, which also rotate synchronously, so as to obtain uniform and constant wrapping of said cores and thus have a uniform thickness of the tubes being manufactured and thus better qualitative results.

Figure 12:
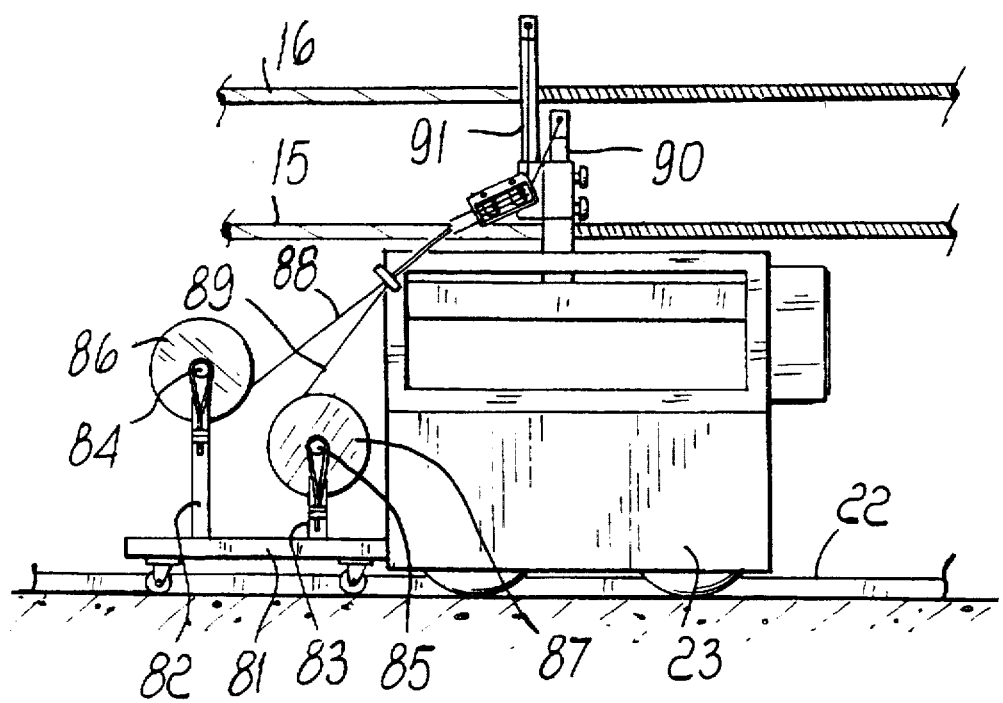
FIG. 12 is a front view of the carriage of FIG. 1, supporting means for wrapping metallic reinforcement wires on the tubes being manufactured.
Figure 13:
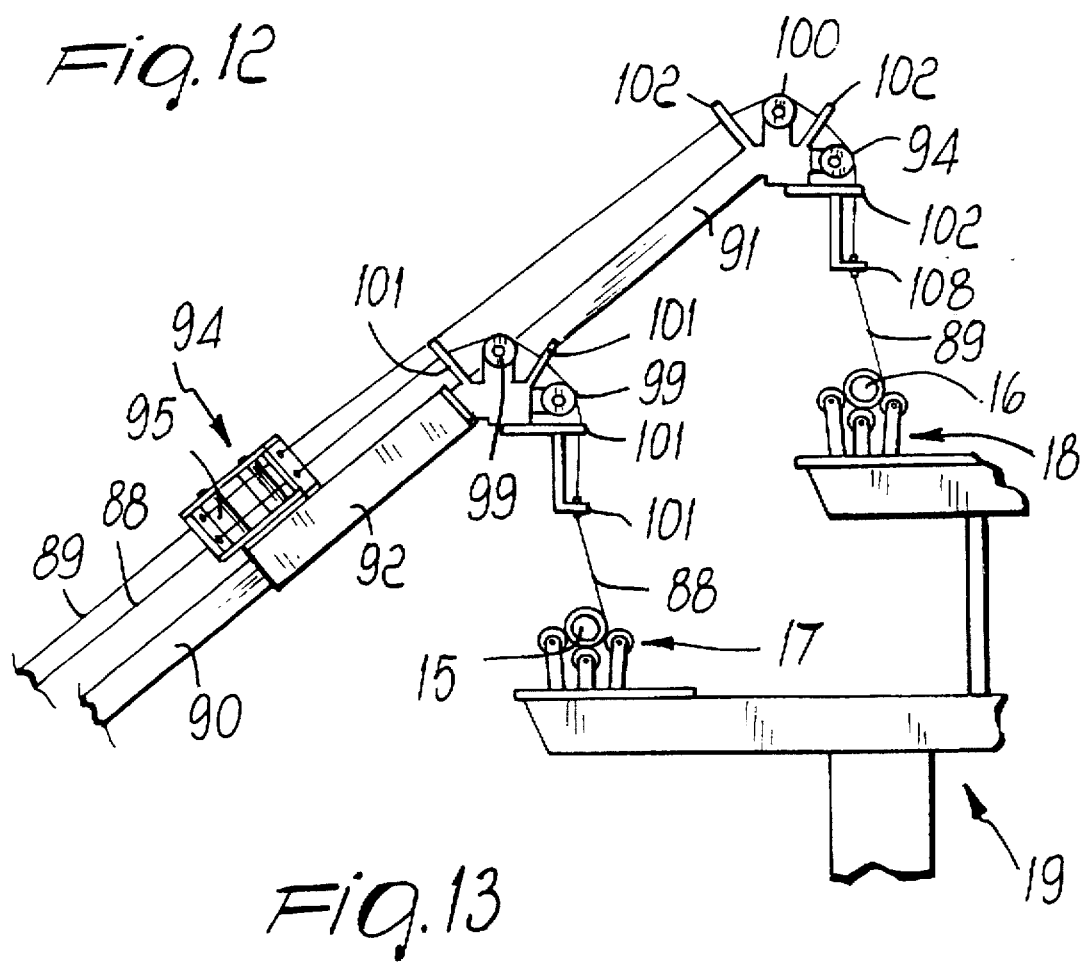
FIG. 13 is a side view of said means of FIG. 12.
Figure 14:
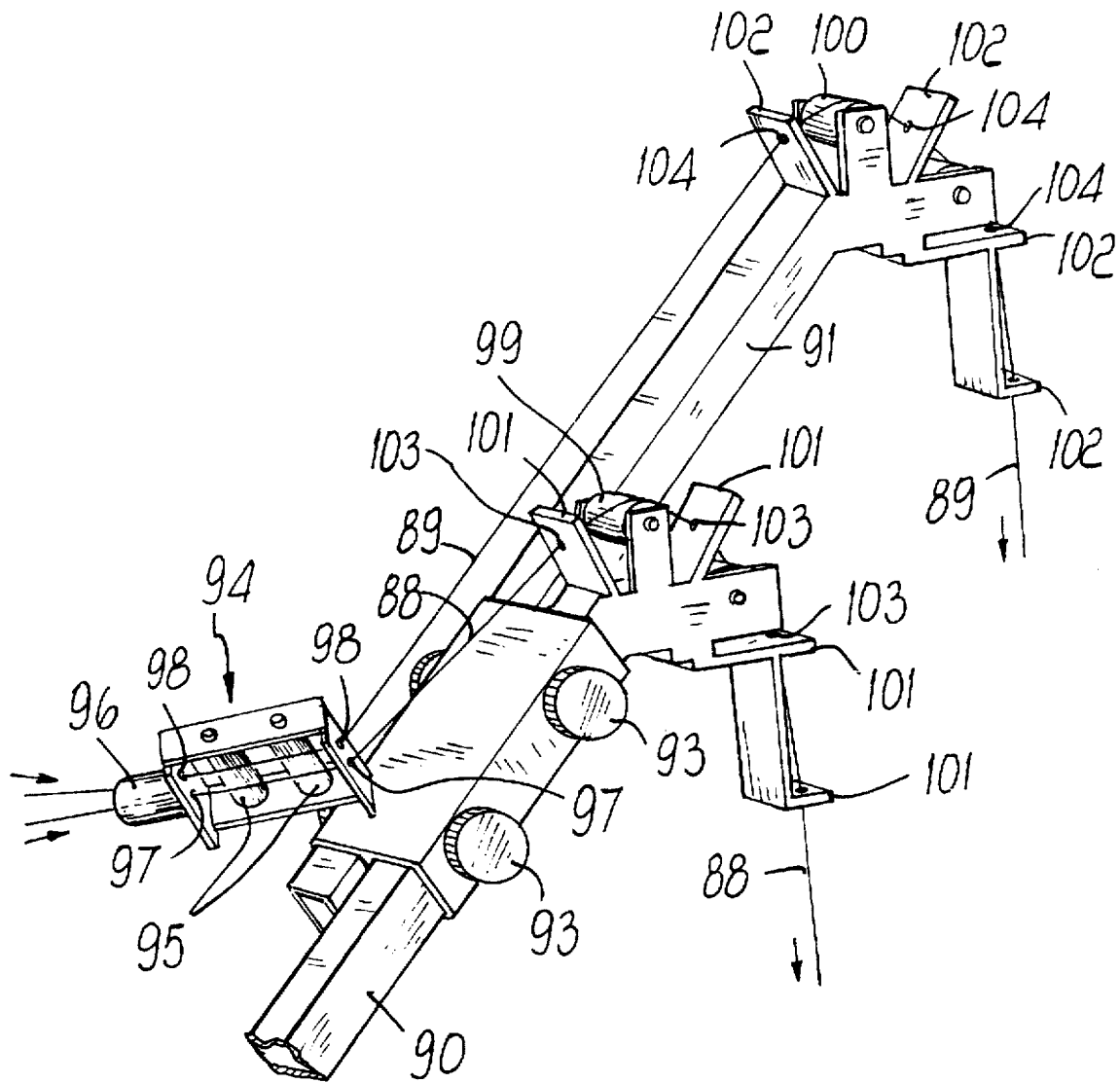
FIG. 14 is a perspective view of the means related to FIGS. 12 and 13.

With reference now in particular to FIGS. 12 to 14 mentioned earlier, if the tubes being manufactured must be reinforced with metallic wires, other wrapping means are mounted on the carriage 23, and said carriage is provided with an auxiliary carriage 81 with fork-shaped supports 82 and 83 for shafts 84 and 85 which support respective reels 86 and 87 on which metallic wires 88 and 89 are wound.

A frame, not shown in the figures, is mounted on the carriage 23 and supports a first rod 90 from which a second rod 91 extends laterally.

The two rods 90 and 91, which are arranged at right angles above the two cores 15 and 16, are embraced by a tubular element 92 which supports screw elements 93 for fixing.

This allows to vary the distance between the heads of the two rods 90 and 91.

A structure 94 is fixed, for example by welding, on said tubular element 92; said structure rotatably supports two redirection rollers 95 for said wires 88 and 89 and a tubular guide 96 for said wires.

The wires 88 and 89 pass through adapted holes 97 and 98 of the structure 94.

Each head of the rods 90 and 91 supports redirection rollers, respectively 99 and 100, and bars, respectively 101 and 102, with guiding holes, respectively 103 and 104, for each one of the wires 88 and 89, so as to move them above the respective cores 15 and 16 for wrapping, as shown in FIG. 13.

From what has been described above it is thus evident that means are provided for wrapping said cores 15 and 16 simultaneously, both in the case of material in ribbon form and in the case of material in wires.

In practice it has been observed that the intended aim and objects of the present invention have been achieved.

The invention thus conceived is susceptible to numerous modifications and variations, all of which are within the scope of the inventive concept.

All the details may furthermore be replaced with other technically equivalent elements.

In practice, the materials employed, so long as they are compatible with the contingent use, may be any according to the requirements.

I claim:

1. An apparatus for manufacturing polymeric tubes comprising:

at least two tubular cores;

means for simultaneously wrapping at least two ribbons of polymeric material on said at least two tubular cores to define at least two tubes;

means for simultaneously supplying electrical power to both of said at least two cores for heating said cores by means of the Joule effect and thereby simultaneously vulcanizing said at least two tubes;

a thermally insulated box-like container for containing said cores during heating thereof; and a carriage controllably movable along guides disposed substantially parallel to said cores, said means for simultaneously wrapping at least two ribbons of polymeric material on said at least two tubular cores being mounted on said carriage;

wherein said means for simultaneously wrapping comprise a frame which carries reels of ribbons of materials suitable to be unwound to form the tubes, and wherein said frame is movable with respect to said carriage in a manner including at least one of a rotation movement of said frame about an essentially vertical axis and a translatory movement of said frame in a direction extending essentially perpendicularly to the movement of said carriage; and wherein said frame is movable with respect to said carriage so as to include the rotation movement of said frame about the essentially vertical axis, said frame comprising a pair of wings extending mutually opposite from said vertical axis, and wherein said means for simultaneously wrapping comprise means for carrying said reels of ribbons on both of said pair of wings.

2. An apparatus as set forth in claim 1 wherein said vulcanizing takes place from the inside to the outside of said tubes.

3. An apparatus as set forth in claim 1 wherein said container has opposite heads provided with terminal strips which comprise said means for supplying electrical power.

4. An apparatus as set forth in claim 1 further comprising means for spirally wrapping reinforcing wires around said ribbons of polymeric tube material.

5. An apparatus as set forth in claim 1 wherein said carriage and said frame are moveable such as to selectively arrange said wings of said frame and said reels of ribbons carried on said wings substantially above said cores.

6. An apparatus as set forth in claim 5 wherein said means for carrying said reels of ribbons comprise means for carrying two reels of ribbons on each of said wings.

7. An apparatus for manufacturing polymeric tubes comprising:

at least two tubular cores;

means for simultaneously wrapping at least two ribbons of polymeric material on said at least two tubular cores to define at least two tubes;

means for simultaneously supplying electrical power to both of said at least two cores for heating said cores by means of the Joule effect and thereby simultaneously vulcanizing said at least two tubes;

a thermally insulated box-like container for containing said cores during heating thereof; and a carriage controllably movable along guides disposed substantially parallel to said cores, said means for simultaneously wrapping at least two ribbons of polymeric material on said at least two tubular cores being mounted on said carriage;

wherein said means for simultaneously wrapping comprise a frame which carries reels of ribbons of materials suitable to be unwound to form the tubes, and wherein said frame is movable with respect to said carriage in a manner including both a rotation movement of said frame about an essentially vertical axis and a translatory movement of said frame in a direction extending essentially perpendicularly to the movement of said carriage;

said frame comprising a pair of wings extending mutually opposite from said vertical axis, and wherein said means for simultaneously wrapping comprise means for carrying said reels of ribbons on both of said pair of wings.

* * * * *